United States Patent [19]
Ballard

[11] Patent Number: 5,793,049
[45] Date of Patent: Aug. 11, 1998

[54] OPTICAL FILTERING AND SPECTROSCOPIC IMAGING

[75] Inventor: Stephen Gwyn Ballard, Hamden, Conn.

[73] Assignee: Yale University, New Haven, Conn.

[21] Appl. No.: 498,606

[22] Filed: Jul. 6, 1995

[51] Int. Cl.[6] .................................................. G01N 21/64
[52] U.S. Cl. ........................... 250/458.1; 250/459.1
[58] Field of Search ........................ 250/458.1, 459.1, 250/461.1; 356/300; 359/615

[56] References Cited

U.S. PATENT DOCUMENTS

| | | | |
|---|---|---|---|
| 3,907,430 | 9/1975 | Mann | 359/615 |
| 4,031,398 | 6/1977 | Callis et al. | 250/458.1 |
| 5,051,162 | 9/1991 | Kambara et al. | 250/458.1 |
| 5,192,980 | 3/1993 | Dixon et al. | 250/458.1 |
| 5,294,799 | 3/1994 | Aslund et al. | 250/458.1 |
| 5,418,371 | 5/1995 | Aslund et al. | |
| 5,424,841 | 6/1995 | Van Gelder et al. | 250/458.1 |

*Primary Examiner*—Michael J. Tokar
*Assistant Examiner*—Richard Hanig
*Attorney, Agent, or Firm*—Fish & Richardson, P.C.

[57] ABSTRACT

An imaging scheme for illuminating an object having a plurality of fluors comprising: a light source for simultaneously illuminating the object with light having a plurality of separate excitation bands respectively falling within the fluorescent absorption bands of the fluors; and a detector positioned to receive fluorescent light from the fluors having wavelengths corresponding to the respective fluorescence emission bands of the fluors and adapted to produce a signal representative of the intensity of light received from the object. Also disclosed is an optical filtering scheme for receiving light having a first wavelength distribution and for providing light having a second selected wavelength distribution different from the first wavelength distribution. The above-mentioned imaging and filtering schemes enable simultaneous excitation and detection of a plurality of fluors, while preventing corruption by scattered or reflected excitation light. This enables efficient detection of about 90–95% of the fluorescence emissions from the fluors in the sample.

27 Claims, 9 Drawing Sheets

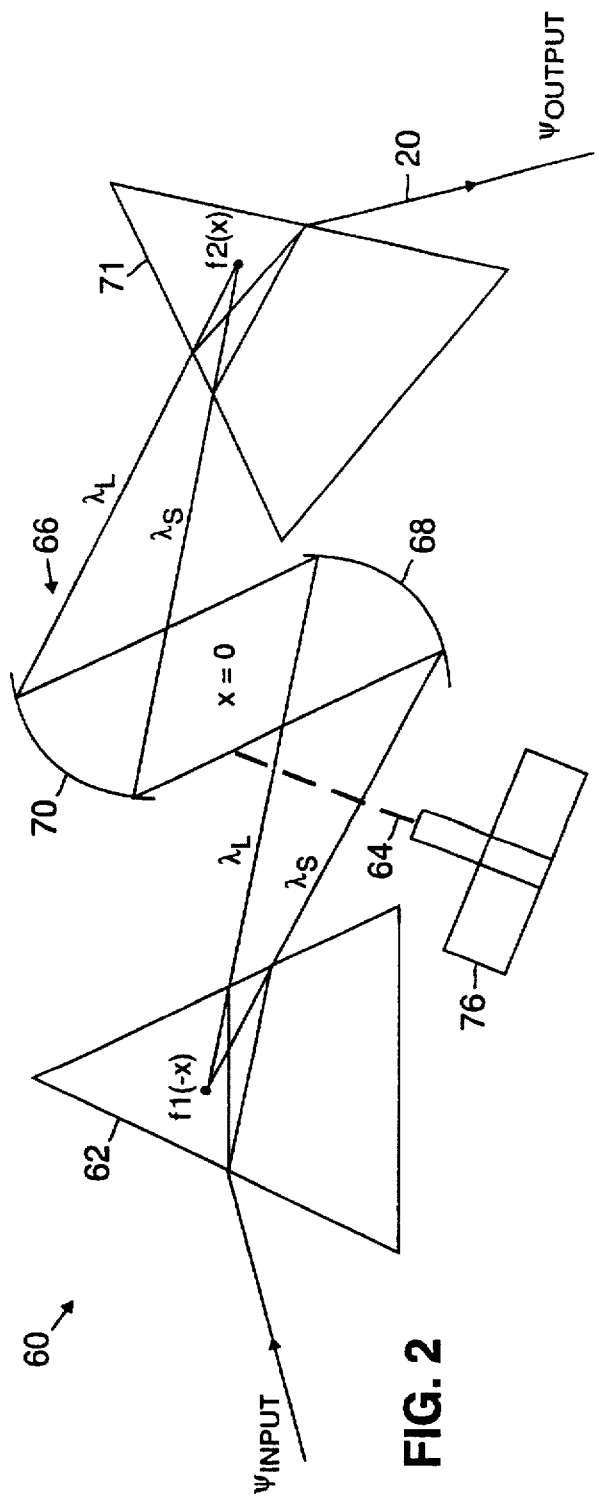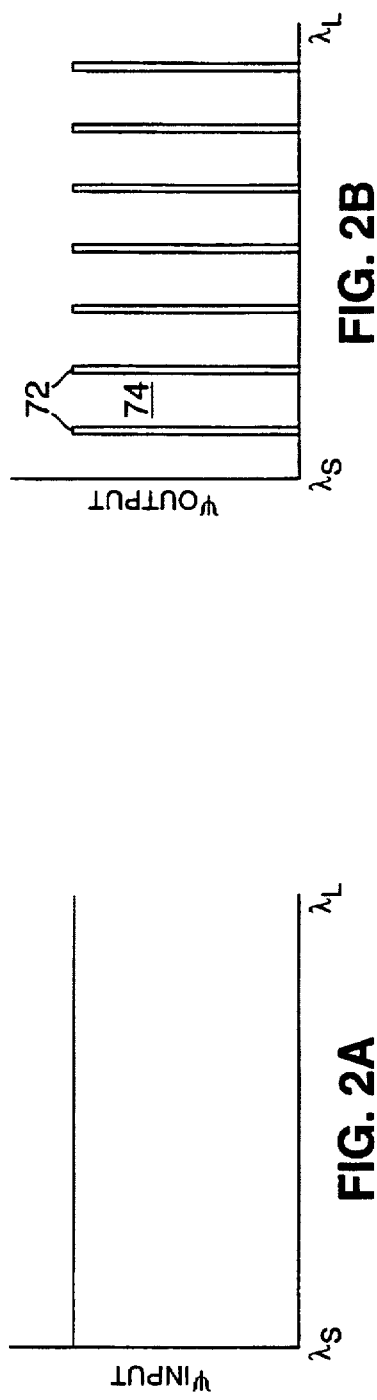

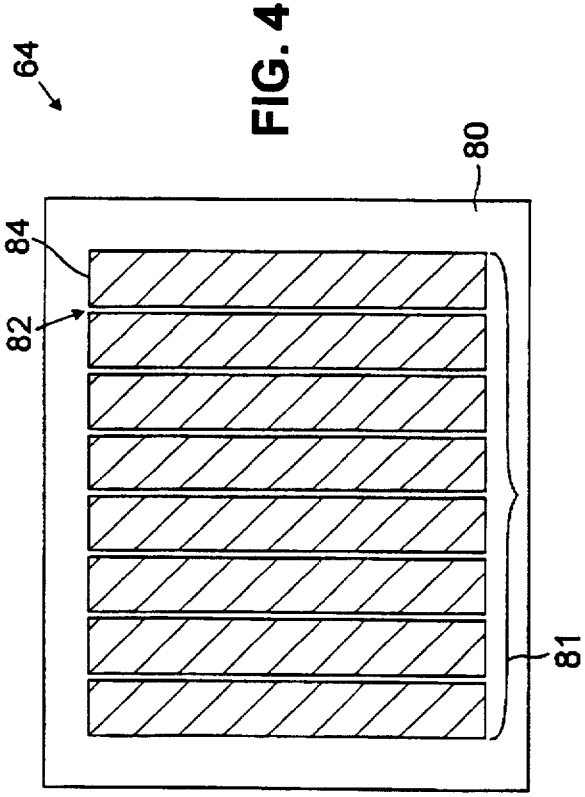
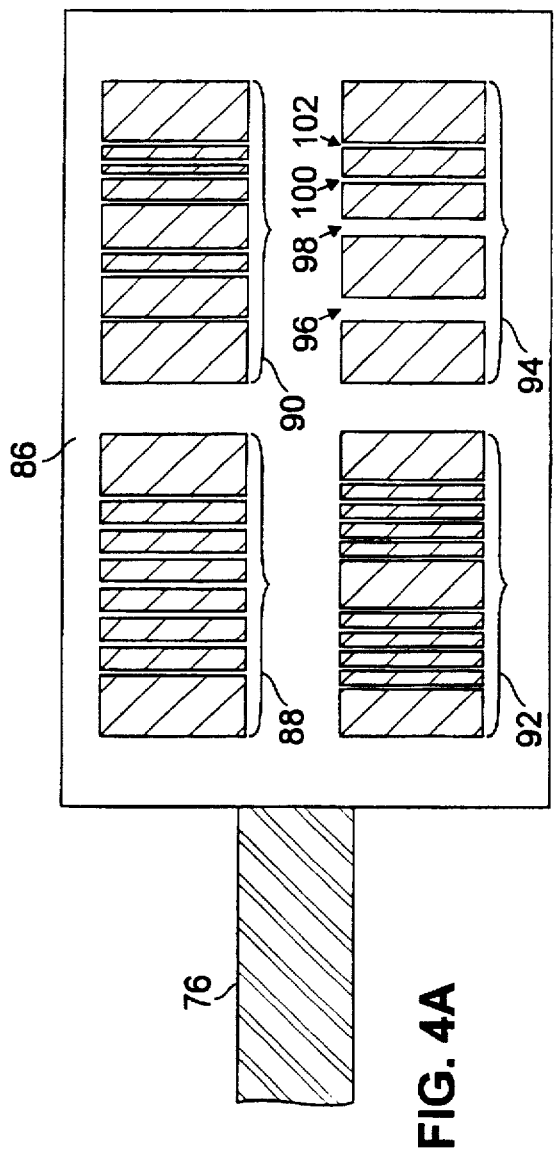

OPTICAL FILTERING AND SPECTROSCOPIC IMAGING

BACKGROUND OF THE INVENTION

This invention relates to optical filtering and spectroscopic imaging.

Spectroscopic imaging combines the functions of imaging and spectral analysis. Imaging involves "mapping" an observable physical property of an object in a manner that preserves relative spatial relationships in the object. In most cases, imaging is achieved by applying optical transforms to radiation emitted by the object. Spectral analysis involves identifying an object based on an analysis of the energy distribution of the imaged radiation emitted by the object. This may be referred to as the "spectral signature" of the object. The spectral signature of an object may in principle be derived either from some intrinsic property of the object, or from "labels" attached to the object. In many cases, the object itself may have no useful intrinsic spectral signature. For this reason, methods for attaching extrinsic labels to specific structures have been developed. Examples include immunofluorescence for site-specific visualization of proteins, and fluorescence in-situ hybridization techniques (FISH) for sequence-specific visualization of nucleic acids.

By using multiple spectrally distinguishable labels, it is possible to "encode" multiple objects simultaneously, which permits multiple objects to be identified in the same image by spectroscopic imaging techniques. The simplest method uses one fluor per object; however, this limits the number of discriminable objects to the number of fluors. The use of multiple fluors in combination makes it possible to uniquely label many more objects than there are available distinguishable fluors.

Thus, it is often desirable to use multiple fluors, e.g., to label a sample. But certain obstacles have made spectrofluorometric imaging of multiple fluors difficult. In particular, the wavelength interval for optimal excitation of a particular fluor may overlap with the interval for optimal detection of the fluorescence of an adjacent fluor. Hence light used to excite one fluor tends to reflect and scatter from the sample and obscure fluorescence from an adjacent fluor. Known imaging systems avoid this problem by imaging each fluor separately using a sequence of narrowband filter sets, each designed to selectively excite and detect the fluorescent emission of a particular fluor. The throughput of such systems, however, is low, because only a single fluor is imaged at a time. Also, such systems filter out and do not use much of the fluorescent light produced by the excited fluors. This is disadvantageous because a fluor can only fluoresce a finite number of times before it is bleached and cannot fluoresce any more. For these reasons, such systems receive relatively low signal levels and are characterized by relatively low signal-to-noise ratios.

SUMMARY OF THE INVENTION

The invention concerns a scheme for simultaneously imaging multiple fluors in a sample by simultaneously exciting a plurality of the fluors in the sample and simultaneously detecting the fluorescent light produced by the fluors. The invention overcomes problems associated with imaging systems which use narrowband filters and enables efficient imaging of samples labeled with a plurality of fluors with a high throughput and a high signal-to-noise ratio. The invention includes a novel optical filter that passes light from a broadband light source corresponding to predetermined wavelength bands, and blocks light corresponding to other wavelengths. The spectral content of the wavelength bands that are passed can be arbitrarily adjusted, e.g., for optimal excitation and discrimination of a given set of fluors used to label a sample.

In one aspect, the invention features an imaging system for illuminating an object having a plurality of fluors comprising: a light source for simultaneously illuminating the object with light having a plurality of separate excitation bands respectively falling within the fluorescent absorption bands of the plurality of fluors; and a detector positioned to receive fluorescent light from the fluors having wavelengths corresponding to the respective fluorescence emission bands of the fluors and adapted produce a signal representative of the intensity of light received from the object.

In another aspect of the invention, useful for illuminating an object having a plurality of fluors and for detecting fluorescent radiation emitted by the fluors, the imaging system includes an optical blocking element positioned to intercept light from the object and adapted to selectively prevent light having wavelengths corresponding to the wavelengths of the plurality of separate excitation bands of the source light from reaching the detector.

In yet another aspect of the invention, useful for illuminating an object having a plurality of fluors, the imaging system includes an optical dispersing element positioned to intercept light from the object and adapted to disperse light received from the fluors according to wavelength and to direct the dispersed light onto the detector.

The light source preferably comprises an optical filter adapted to receive light from a broadband light source and to produce therefrom light corresponding to the separate excitation bands of the illuminating source light. In some embodiments, the optical filter comprises a first optical element positioned to receive light from a source light having a first wavelength distribution and adapted to spatially distribute the received light according to wavelength, and a second optical element positioned to receive the light spatially distributed by the first optical element and having a selected pattern of regions of different light-modifying properties selected to selectively separate, from the light of the first wavelength distribution, light of a second wavelength distribution corresponding to the separate excitation bands of the illuminating light. The selected pattern of regions of the second optical element preferably comprises one or more light-transmissive regions and one or more non-transmissive regions. A third optical element is preferably positioned to receive light dispersed by the first optical element and to converge the received light so that the converged light is no longer spatially separated according to wavelength. In some embodiments, the same optical filter is positioned to receive light from the object and is further adapted to selectively prevent light having a wavelength corresponding to the separate excitation bands of the illuminating light from reaching the detector. In some other embodiments, an optical blocking element is positioned to receive light from the object and is adapted to selectively prevent light having a wavelength corresponding to the separate excitation bands of the illuminating light from reaching the detector; the optical blocking element having a selected pattern of regions of different light-modifying properties that is complementary to the pattern of regions of the second optical element of the optical filter. The light source is preferably adapted to produce the separate excitation bands of light with respective widths that are narrower than the spectral distances separating the excitation bands. For certain applications, the excitation bands of the illuminating light are preferably separated by about 35–50 nm and have respective spectral widths of about 5–10 nm.

In another aspect, the invention features methods of spectroscopically imaging a plurality of fluors in an object.

In a further aspect, the invention features an optical filter comprising: a first optical element positioned to receive light of a first wavelength distribution and adapted to spatially distribute the received light according to wavelength; a second optical element positioned to receive the light spatially distributed by the first optical element and having a selected pattern of regions of different light-modifying properties selected to selectively separate, from the light of the first wavelength distribution, light corresponding to a second wavelength distribution having a plurality of separate wavelength passbands; and a third optical element positioned to receive the light spatially-distributed by the first optical element and adapted to converge the received light so that the converged light is no longer spatially separated according to wavelength.

The excitation, detection, and spectral analysis of multiple fluors simultaneously is difficult because multiple excitation and emission intervals are necessary and because optimal results require that no excitation interval overlap any emission interval. The present invention enables simultaneous excitation and detection of multiple fluors in a sample. The imaging system can collect and make use of all fluorescent photons emitted by the fluors in a sample (object), while at the same time rejecting interfering scattered and reflected light. High throughput is possible using the invention because the imaging system is capable of imaging all fluors in parallel. The complementary bi-functionality of the mask filter enables the optical filter to selectively block out those wavelengths that would otherwise interfere with detection of the fluorescence by quickly saturating the detector. Furthermore, this blocking feature cannot go out of adjustment or calibration. Since filters that are absorbing at the fluorescing wavelengths are not used in spectrofluorometric imaging applications according to the invention, high efficiencies can be achieved, enabling much more efficient use of many of the finite, limited number of fluorescent photons emitted by the system under observation.

Other features and advantages will become apparent from the following description and from the claims.

DESCRIPTION OF THE DRAWINGS

FIG. 2 is a schematic view of the optical filter implemented for excitation of multiple fluors.

FIG. 2A is a diagrammatic plot of the wavelength distribution of input light received by the filter of FIG. 2.

FIG. 2B is a diagrammatic plot of the wavelength distribution of the light of FIG. 2A, after having passed through the filter of FIG. 2.

FIG. 4 is a diagrammatic face view of a transparent substrate bearing a pattern of light transmissive and non-transmissive regions.

FIG. 4A is a diagrammatic face view of a transparent substrate coupled to a movable arm and bearing four different patterns of light transmissive and non-transmissive regions.

DESCRIPTION OF THE PREFERRED EMBODIMENTS

Figure 1:
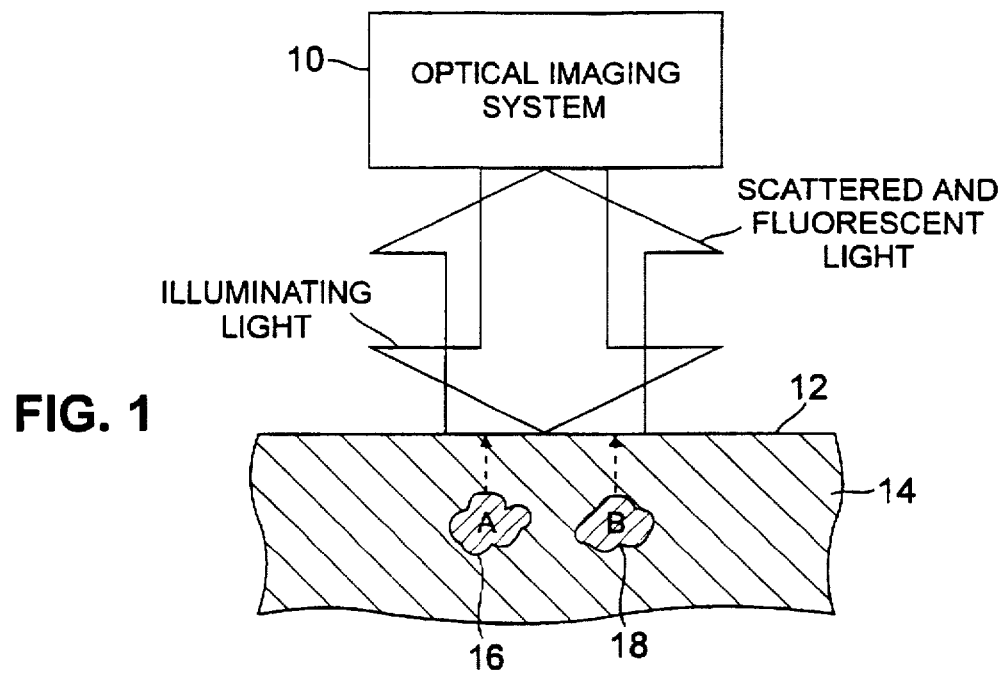
FIG. 1 is a diagrammatic side view of an optical imaging system illuminating the surface of a sample.

Referring to FIG. 1, an optical imaging system 10 is positioned to illuminate a surface 12 of a biological sample 14 containing two biological structures 16, 18 respectively labeled with different fluorescent dyes A, B. Imaging system 10 illuminates sample 14 with light 20 having a wavelength distribution selected to enable simultaneous excitation and detection of the fluorescently labeled structures 16, 18. A portion 22 of the light from the imaging system reflects or scatters from sample 14 and returns to the imaging system. Other portions of light 20 penetrate surface 12 and become absorbed by the fluorescent dyes in structures 16, 18. The absorbed light excites the dyes A and B, which subsequently emit fluorescent radiation 30 that is received by the imaging system.

Figure 1A:
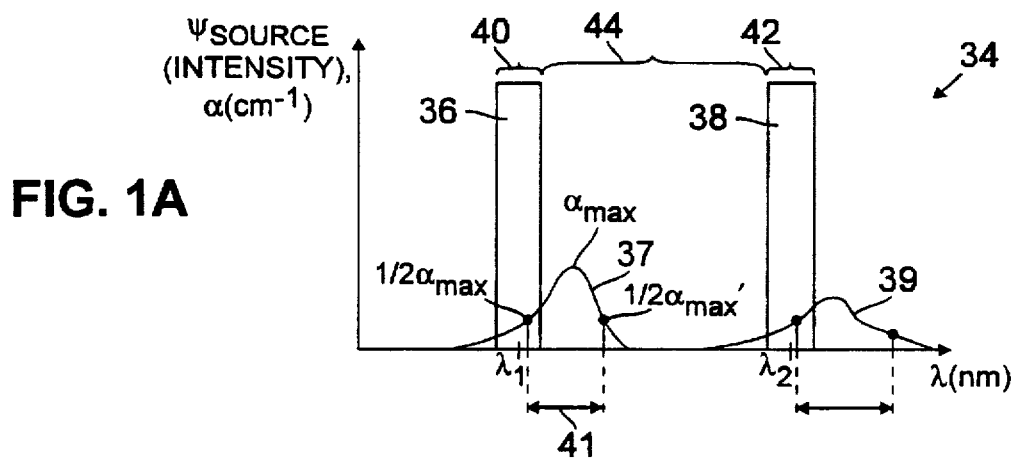
FIG. 1A is a diagrammatic plot of the wavelength distribution of the light illuminating the sample of FIG. 1.

As shown in FIG. 1A, the light injected by the imaging system has a wavelength distribution 34 having two separate wavelength bands 36, 38 respectively centered about wavelengths $\lambda_1$ and $\lambda_2$ that fall within the absorption bands 37, 39 of dyes A and B, respectively. As used herein, the term "separate" is used to broadly refer to excitation passbands that have substantially no overlap between them. The "band" of a wavelength distribution is defined as the spectral wavelengths between the half-maximum wavelengths of the distribution. For example, the absorption band 41 of dye A corresponds to the spectral region between $\frac{1}{2}\alpha_{max}$ and $\frac{1}{2}\alpha_{max}'$ in the absorption band 37 of dye A. We note that the excitation passbands 36, 38 nearly approximate the shape of step functions, with insubstantial sidebands. This feature is preferable for imaging multiple fluors in a sample. For example, an excitation sideband intensity of about 1% of the peak intensity that overlaps with the fluorescent emission bands will preclude detection of the fluorescent emission, which has a typical relative intensity of about 0.001% or less. In preferred embodiments, the widths 40, 42 of the excitation bands are much narrower than the spectral distance 44 separating the bands. The particular widths 40, 42 and the distance separating excitation bands 36, 38 is determined by optimizing the contrast (the ratio of intended fluorescence to unintended fluorescence) between adjacent fluors, and ensuring sufficient integrated excitation flux to adequately excite each fluor.

Figure 1B:
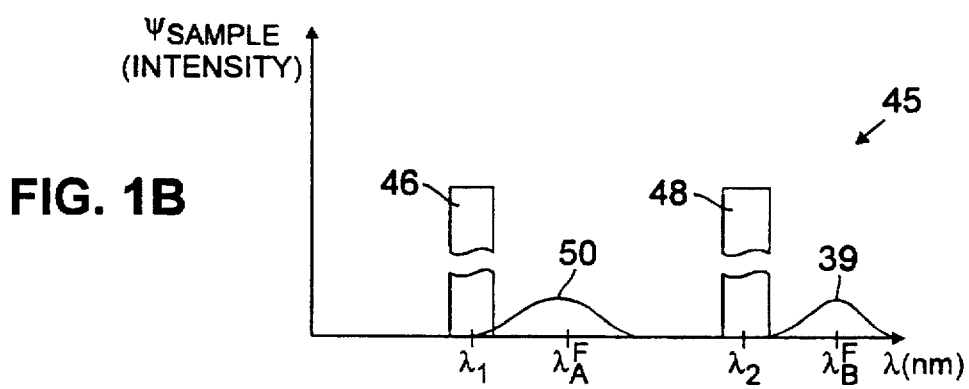
FIG. 1B is a diagrammatic plot of the wavelength distribution of the light received by the imaging system of FIG. 1 from the sample.

Referring to FIG. 1B, the light received by the imaging system, from the sample, has a wavelength distribution 45 that includes bands 46, 48 of reflected or scattered light, centered around $\lambda_1$ and $\lambda_2$, and bands 50, 52 of fluorescent light emitted by dyes A and B, with peak intensities respectively centered about $\lambda_A^F$ and $\lambda_B^F$. Fluorescent radiation bands 50, 52 are centered about wavelengths that are longer than the center wavelengths of the exciting light bands 36, 38 (FIG. 1A). Typically, the intensity of the received fluorescent radiation is about five orders of magnitude less than the intensity of the excitation light reflected or scattered from the sample and received by the imaging system. To reduce corruption of the fluorescent signals by scattered or reflected excitation light, the excitation bands 36, 38 are preferably selected so that fluorescent wavelength bands 50, 52 correspond to wavelength "windows" outside of the excitation bands. The particular excitation bands selected will depend on the absorption and emission characteristics of the fluorescent dyes labeling the biological structures within the sample to be analyzed.

In a presently preferred embodiment, about 80–90% (e.g., preferably between 35–50 nm, and more preferably about 40 nm) of the respective fluorescent emission bands of the fluors fall within the wavelength windows, whereas the excitation bands only fall within about 10–20% (e.g., preferably between 5–10 nm, and more preferably about 5 nm) of the respective absorption bands of the fluors. In this way, most of the fluorescent light emitted by the fluors can be detected without significant corruption by the excitation light. Since the total fluorescence emitted by a fluor varies proportionally with the product of the absorption coefficient and the intensity of the exciting light, the fluorescent intensity can be increased to detectable levels even though the excitation band is relatively narrow and doesn't necessarily correspond to the absorption peak of the fluor simply by increasing the intensity of the exciting light.

Referring to FIG. 2, excitation light 20 is formed by a unique optical filter 60 that includes a light-dispersing prism 62, a mask 64, converging optics 66 formed from two cylindrical mirrors 68, 70, and a recombining prism 71. In operation, dispersing prism 62 receives light from a broadband light source, $\psi_{INPUT}$, having a wavelength band between $\lambda_S$ and $\lambda_L$, and disperses the received light, thereby spatially separating the light according to wavelength. The dispersed light passes through mask 64 and is symmetrically re-converged by converging optics 66. Mask 64 selectively transmits wavelengths corresponding to desired excitation bands and selectively blocks the transmission of light corresponding to other wavelengths. Recombining prism 71 recombines the spectral components of the light transmitted by mask 64. The features on the mask (i.e., the non-transmissive stripes and the transmissive windows) are substantially larger than the operating wavelengths used in most applications. This enables the optical filter to produce excitation bands that have nearly step function characteristics, with insubstantial intensities in the sidebands (corresponding to spectral regions between emission bands).

As shown in FIG. 2A, the input light, $\psi_{INPUT}$, received by the optical filter has a substantially uniform wavelength distribution (e.g., from a high-pressure Xenon arc or a Tungsten-Halogen filament lamp). Referring to FIG. 2B, the resulting excitation light, $\psi_{OUTPUT}$, transmitted to the output of filter 60, has a series of narrow wavelength bands 72 separated by relatively wide spaces 74, in which there is no photon flux. Such a wavelength distribution is particularly useful for generally enabling simultaneous fluorescence excitation and detection of multiple fluors. It maybe referred to as an "excitation comb."

Mask 64 is preferably mounted on a positioner 76 (e.g., a computer-controlled arm) that allows the orientation of the mask relative to dispersing prism 62 to be selectively varied, enabling selective control of the resulting excitation bands. For example, when the mask is moved toward or away from prism 62, the wavelength bands 72 (FIG. 2B) are broadened or narrowed, respectively. When the mask is moved up or down, wavelength bands 72 are respectively shifted to the red ($\lambda_L$) or to the blue ($\lambda_S$) regions of the spectrum.

Figure 3:
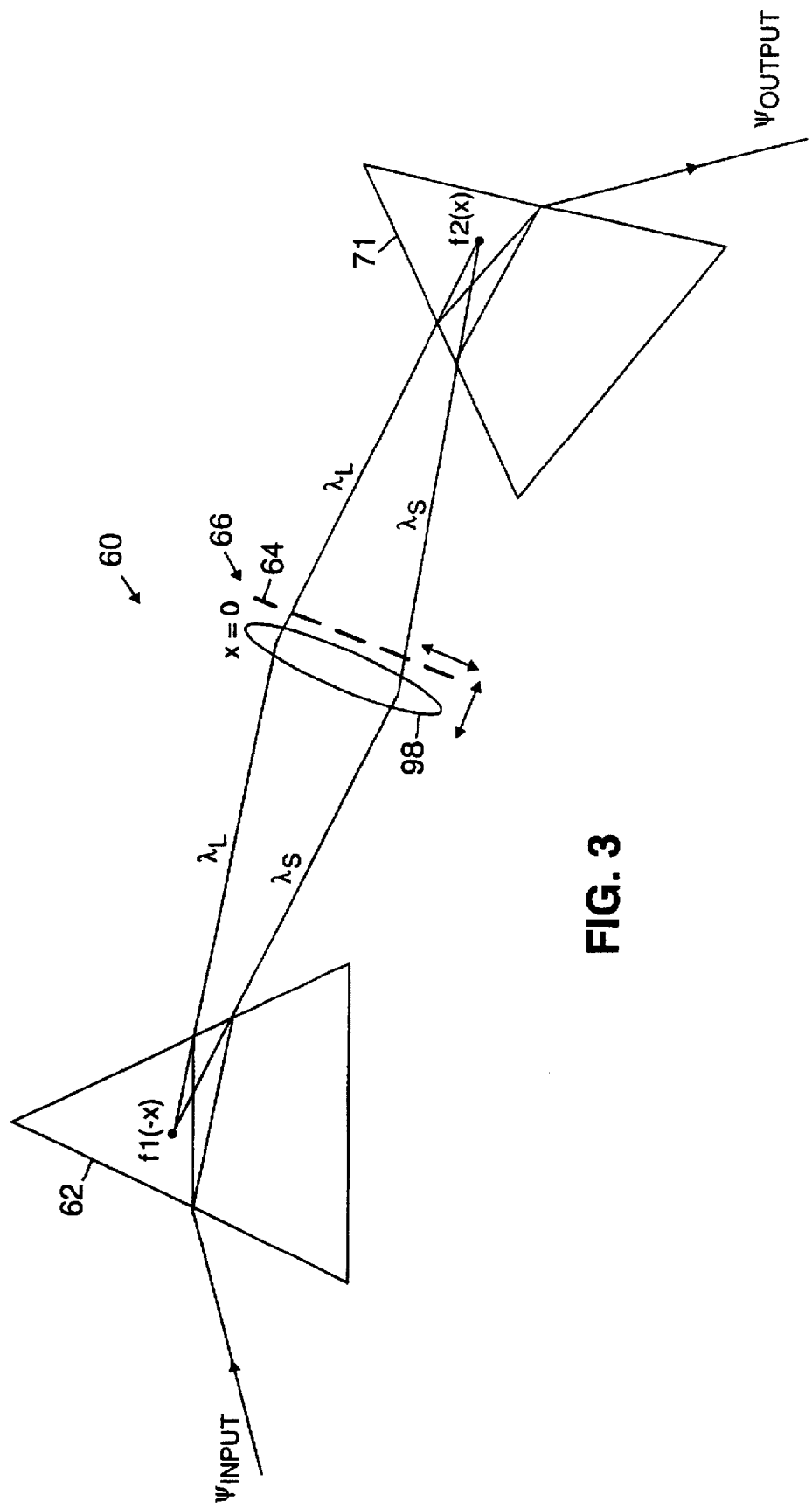
FIG. 3 is a schematic view of an alternative implementation of an optical filter.

Referring to FIG. 3, in an alternative embodiment, converging optics 66 is formed from a cylindrical lens 78 that has a focal length of one quarter of the distance between the virtual conjugate foci of the dispersing and recombining prisms. In a preferred embodiment, lens 78 is an achromatic lens. In this embodiment, the mask is positioned after converging optics 66. However, in this embodiment and in the embodiment shown in FIG. 2, the mask may be positioned either before or after converging optics 66 and achieve substantially the same result.

Referring to FIG. 4, mask 64 is formed from a thin transparent substrate 80 that bears a pattern 81 of one or more light-transmitting regions 82 and one or more non-transmissive regions 84. Substrate 80 has a thickness selected so that negligible optical deviation is produced in the filtered light. In a presently preferred embodiment, pattern 81 is formed from a patterned thin metal film. The patterns of light-transmissive and non-transmissive regions are preferably fabricated by depositing a metal film upon a transparent substrate (e.g., glass or quartz) and defining the pattern by well-known semiconductor device processing techniques (e.g., chemical etching or metallization lift off). In preferred embodiments, the transparent substrate is constructed out of material that is substantially transmissive to light in the operating wavelength range. For example, for UV radiation, the substrate is preferably fabricated from quartz, LiF, CaF, MgF, or sapphire, whereas for visible or infra-red laser radiation, glass, quartz, or low loss moldable plastic materials (e.g., a pellicle) are preferably used.

In an alternative embodiment, mask 64 is formed from a digitally controlled block data composer, e.g., as used for recording data into a holographic memory. According to this embodiment, the pattern of light transmissive and non-transmissive regions is controlled digitally by a computer. Such a scheme may be optimized for imaging multiple fluor sets with a high throughput.

In preferred embodiments, the light input ($\psi_{INPUT}$) into filter 60 is shaped into a line that has an elongated cross-section. For such a line input, pattern 61 includes a series of parallel stripes of metallization that extend parallel to the axis of converging optics 66 (cylindrical mirrors 68, 70 or cylindrical lens 78). These stripes are made long enough to intercept the full width of the light dispersed by prism 62. If the input light was formed into a spot (e.g., for a point-scanning imaging system), shorter metallization stripes could be used. The stripes are designed and positioned to block unwanted wavelengths from the dispersed light passing between the dispersing prism and the recombining prism. The resulting wavelength distribution is determined by the selected metallization pattern and by the selected position of the mask relative to the optical axis.

In the embodiment shown in FIG. 4, the transparent substrate 80 has a single pattern of transmitting and non-transmitting regions. Pattern 81 has a series of substantially identical transmissive regions 82 uniformly spaced apart. Such a pattern is particularly useful in general spectroscopy applications that require a compromise between spectral coverage and efficiency of excitation of an arbitrary fluor set. In a presently preferred embodiment of this type, the resulting filtered light ($\psi_{OUTPUT}$) has excitation bandwidths on the order of 5 nm spaced apart by a distance on the order of 50 nm.

Referring to FIG. 4B, in an alternative embodiment, a transparent substrate 86 has a plurality of patterns 88, 90, 92, and 94 that are customized for different fluor sets. Pattern 88 is similar to pattern 81, except pattern 88 has a narrower spectral coverage. Pattern 90 has transmissive regions that are spaced apart in a manner selected to optimize excitation of a given fluor set, while maintaining sufficient space between the excitation bands to reduce interfering signals from, e.g., light scattered and reflected from the sample. Pattern 94 has two excitation intervals 96, 98 that are several times the spectral bandwidth of the other two light-transmissive regions 100, 102. Such a mask pattern would be particularly useful for exciting very weakly fluorescent fluors having fluorescent absorption bands corresponding to the excitation intervals 96, 98.

Figure 5:
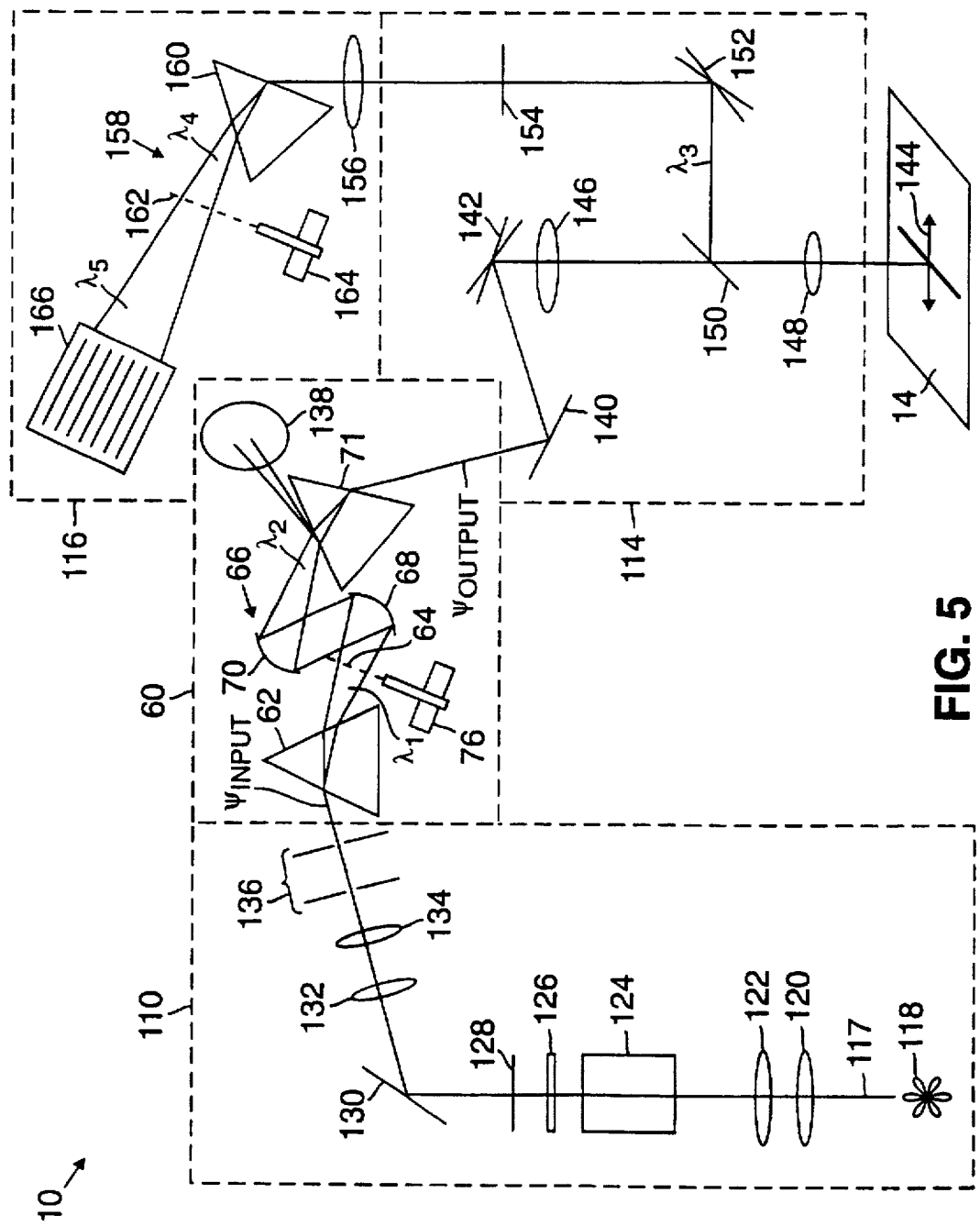
FIG. 5 is a schematic view of an optical imaging system.

Referring to FIG. 5, optical imaging system 10 useful for fluorescent imaging includes a beam forming and shaping system 110, an optidelivering and receiving m delivering and receiving system 114, and a detection system 116. Light 117 is generated in beam forming and shaping system 110 by a high intensity broadband light source 118 (e.g., a Xenon arc lamp) and is subsequently shaped by a series of lenses 120, 122. An infrared filter 124 is used to remove infrared light from light 117 and an ultraviolet filter 126 is used to remove ultraviolet wavelengths. A computer-controlled shutter 128 is used to selectively transmit light from the beam shaping and forming system to the excitation comb filter 60. When the shutter is open, the light is deflected by a mirror 130 and further shaped and focused by lenses 132, 134 and a slit collimator 136. The resulting light ($\psi_{INPUT}$) is then transmitted to the input of filter 60, which includes has the same components as the filters shown in FIGS. 2 and 3, above. An absorber 138 (e.g., a beam dump with a surface that strongly absorbs radiant energy in the operating range, e.g., formed from a block of hard-anodized aluminum with a row of narrow vanes oriented in the direction of the reflected laser beam) is positioned to receive light that reflects from the surface of recombining prism 71.

The light ($\psi_{OUTPUT}$) from filter 60 is transmitted to the input of beam transmitting and receiving system 114. A mirror 140 delivers the excitation beam to a scanning mirror 142 that scans the beam across the surface of sample 14 in a direction transverse to the elongated dimension of the beam, as indicated by double-headed arrow 144. The excitation beam is focused by a telocentric lens 146 and an objective lens 148 before reaching the surface of sample 14.

A pellicle beam splitter 150 directs a portion (typically 90%) of the light received from the sample to a second scanning (i.e., "de-scanning" mirror) mirror 152, which transmits the received light to detection system 116. A second computer-controlled shutter 154 selectively transmits the light from mirror 152 to the detection system, during imaging frame exposure.

A second telocentric lens 156 focuses the light from the detection and receiving system onto an inverse filter 158 that includes a dispersing prism 160 and an inverse mask 162 mounted on a computer-controlled positioner 164. Light transmitted by the inverse mask is received by a detector 165 (e.g., a cooled high sensitivity, charge-coupled device (CCD) detector), which is coupled to a computer for processing the received fluorescent images. The selected detector would be one-dimensional, e.g., for non-imaging spectrofluorometry, and would be two-dimensional, e.g., for imaging spectrofluorometry.

The pattern and position of inverse mask 162 is selected to exclude scattered excitation light that contaminate the fluorescence emissions from the sample. Accordingly, the pattern of metallization on mask 162 is the inverse of the pattern of mask 64—the transmissive regions on mask 162 correspond to the non-transmissive regions on mask 64 and vice-versa. The unwanted wavelengths are removed from the received light because they are reflected by the non-transmissive stripes. The wanted fluorescent wavelengths, on the other hand, are transmitted by the spaces between the stripes to detector 166.

In the embodiment shown in FIG. 5, the non-transmitting regions on mask 64 and on inverse mask 162 may be formed from any material that prevents transmission of undesired light through the substrate. For example, the non-transmissive regions may be formed from highly reflecting material (e.g., an appropriate metal) or from highly absorbing material (e.g., a suitable black body absorbing material).

Figure 6:
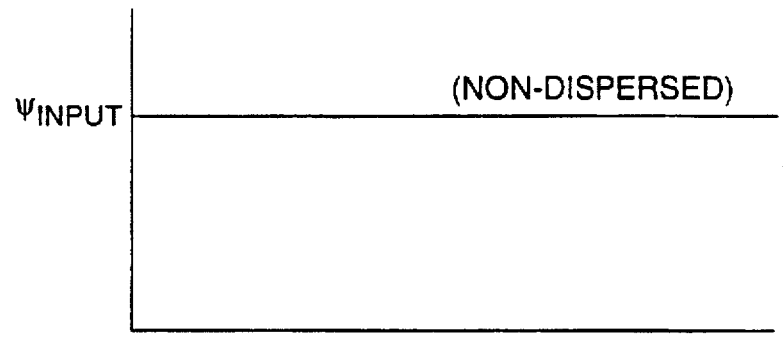
FIGS. 6–6F are plots of the wavelength distribution of light in the optical imaging system of FIG. 5 at various locations within the optical imaging system.
Figure 6A:
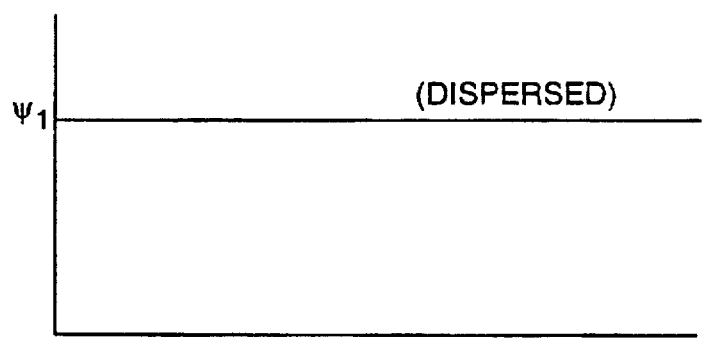
Figure 6B:
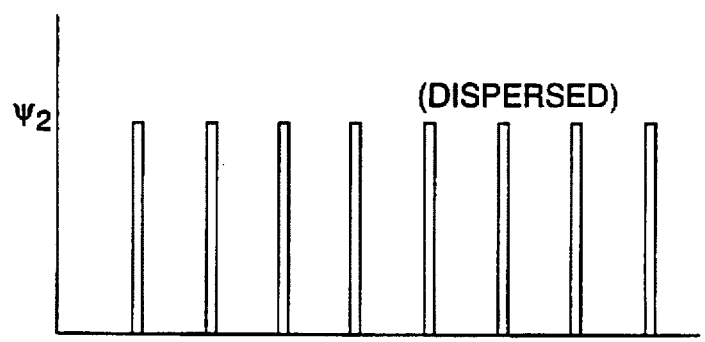
Figure 6C:
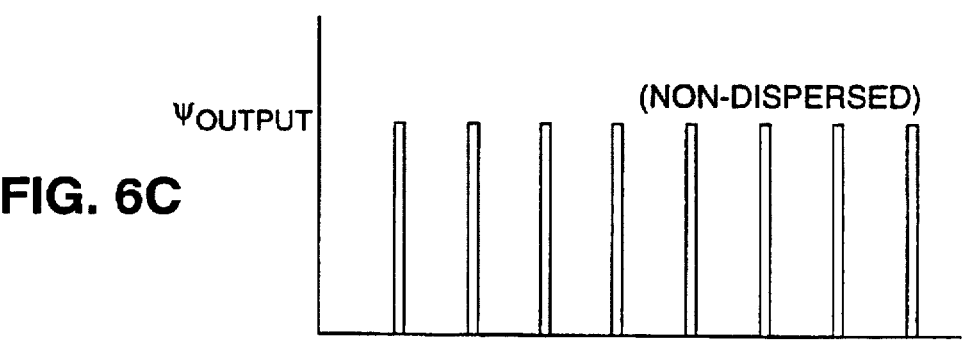
Figure 6D:
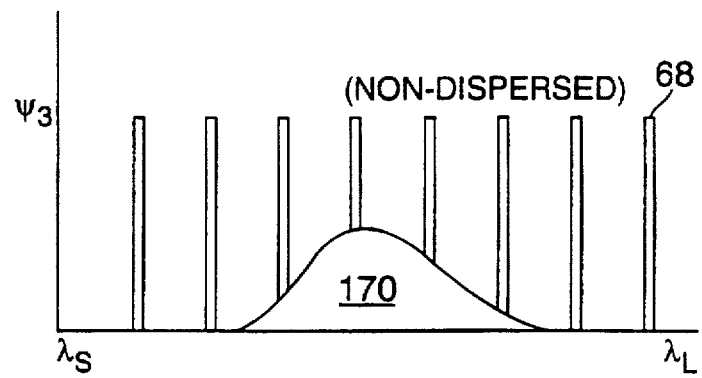
Figure 6E:
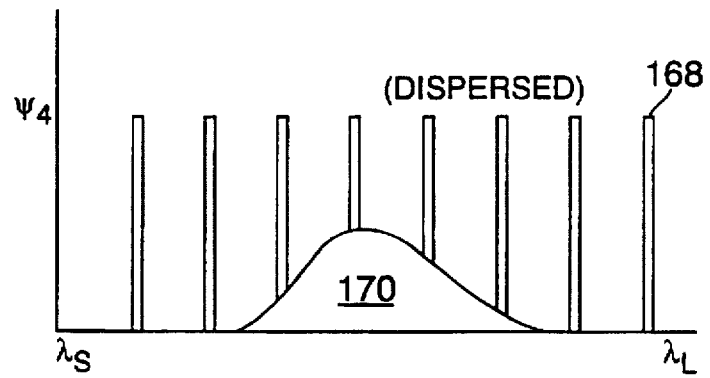
Figure 6F:
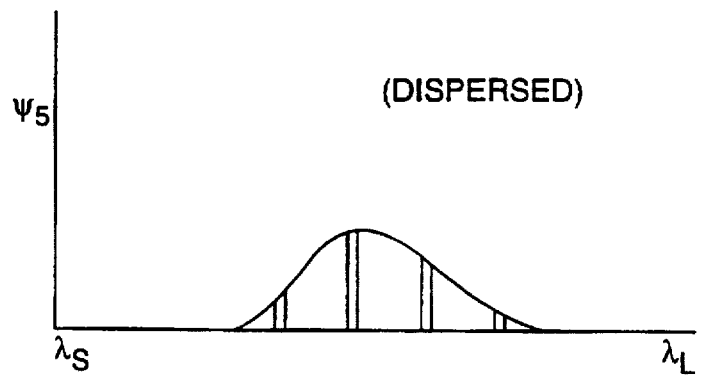

Referring to FIGS. 6–6F, during operation of imaging system 10, the light passing through the system has the following spectral composition characteristics. As discussed above and shown in FIG. 6, the light ($\psi$INPUT) emerging from the beam forming and shaping system 110 is substantially uniform across the operating spectrum. After passing through dispersing prism 62, the light ($\psi_1$; FIG. 6A) has the same spectral composition as $\psi_{INPUT}$, but is spatially separated (dispersed) according to wavelength. Mask 64 removes undesirable wavelengths from $\psi_1$ to provide dispersed excitation light having a desired wavelength distribution ($\psi_2$; FIG. 6B). Recombining prism 71 combines the dispersed light from mask 64 into a single beam ($\psi_{OUTPUT}$; FIG. 6C). Light ($\psi_3$; FIG. 6D) received from the sample includes scattered light 168 and fluorescent light 170 from a single fluor, which make a distribution as shown in FIG. 6D. In general, the scattered/reflected excitation wavelength components are very much more intense than the fluorescence component. The light entering detection system 116 is dispersed by prism 160, as shown in FIG. 6E ($\psi_4$). Inverse mask 162 removes scattered light 168 from the dispersed light ($\psi_4$) before it reaches the detector ($\psi_4$).

Thus, the detector receives primarily fluorescent light spatially distributed according to wavelength, with narrow bands missing from the dispersed spectra, corresponding to the excitation wavelengths. These narrow "dead spots" can easily be interpolated by a computer and are much less problematical than having the same spectral intervals saturated with spurious exciting radiation.

Figure 7:
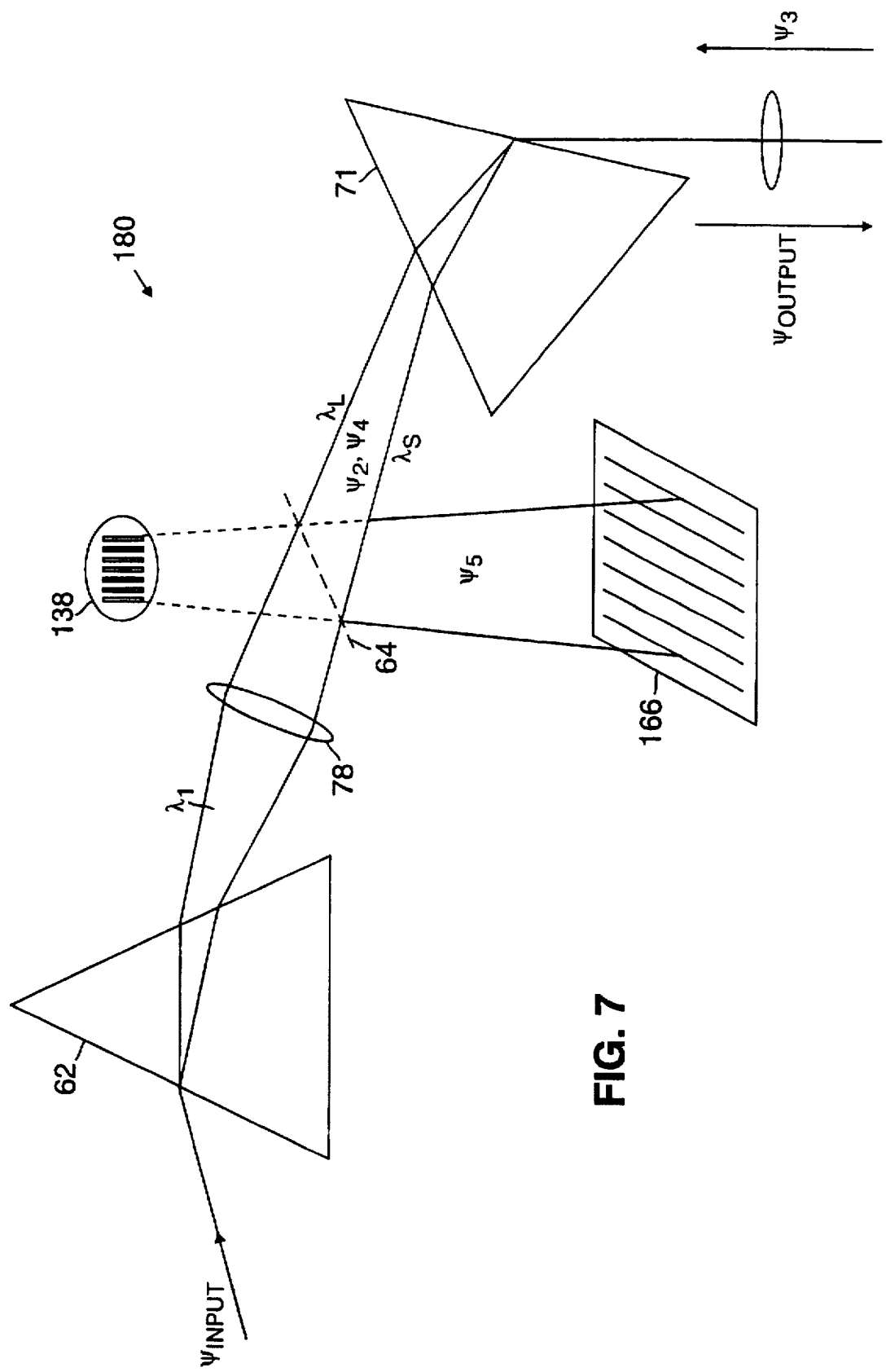
FIG. 7 is a schematic view of an alternative optical filter and detecting system.

Other embodiments are within the scope of the claims. For example, instead of using an inverse filter, the same mask may be used to produce the excitation light and to prevent scattered excitation light from reaching the detector. Referring to FIG. 7, an optical filter 180 uses the same components as shown in FIG. 3A and the spectral compositions of the light in various parts of the filter correspond to the wavelength distributions shown in FIGS. 6–6F. However, in this embodiment, the same spatial filter mask 64 is used to produce the excitation light and to reject light reflected and scattered from the sample (corresponding to the excitation wavelengths), which would otherwise interfere with measurement of the fluorescence emissions from the sample. This is achieved by using the mask bi-functionally. In the forward direction, the mask selectively blocks unwanted wavelengths from the excitation spectrum; in the reverse direction, it selectively reflects the fluorescence to the detector while transmitting the excitation wavelengths back to the source. As mentioned above, these contaminating wavelengths are often many orders of magnitude more intense than the fluorescence to be measured, and are a significant problem in low-level fluorescence spectroscopy.

The unwanted wavelengths are removed from the returning light because they correspond to the spaces between the non-transmissive stripes on the mask (which defined the excitation light). Thus, the unwanted wavelengths pass through the mask and return through the dispersing prism 62 to the broadband source. The wanted fluorescence, on the other hand, is reflected by the metal stripes of mask 64 to detector 166, as shown. At the operating wavelengths, the backside of the mask preferably has a low reflectance between the stripes, and the metal stripes preferably have a high reflectance.

Figure 8:
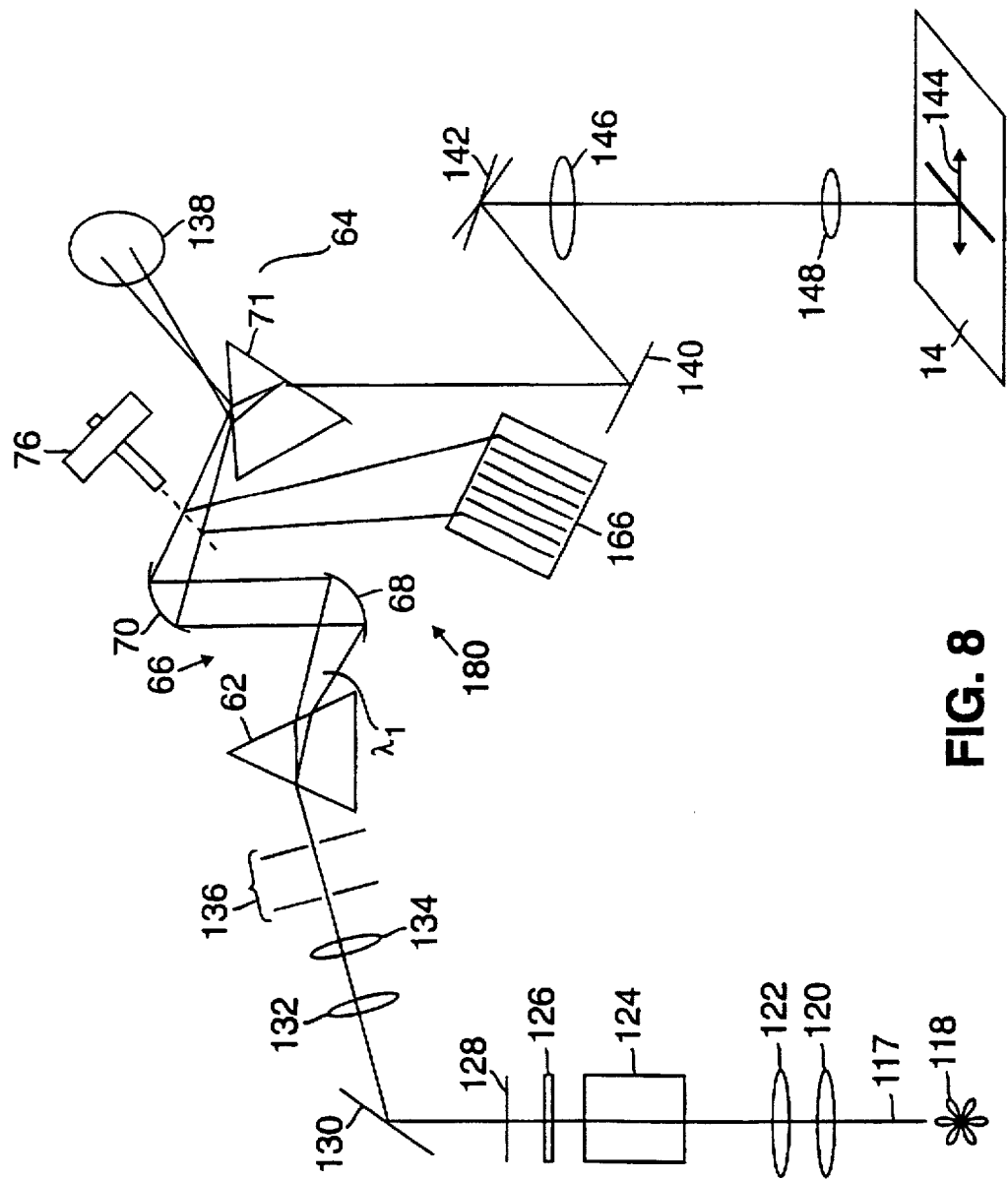
FIG. 8 is a schematic view of an alternative optical imaging system that incorporates the optical filter of FIG. 7.

As shown in FIG. 8, optical filter 180 is easily incorporated into an optical imaging system 182 using many of the same components as used in the optical imaging system of FIG. 5.

Still other embodiments are within the scope of the claims.

What is claimed is:

1. An imaging system for illuminating an object having a plurality of fluors and for detecting fluorescent radiation emitted by the fluors, the fluors having respective absorption bands and respective fluorescence emission bands, the imaging system comprising:

a light source for simultaneously illuminating the object with light having a plurality of separate excitation bands respectively falling within the fluorescent absorption bands of the fluors, wherein the light is emitted from a single medium and wherein each of the excitation bands of light has a width that is less than the spectral distances separating it from its neighboring excitation bands; and a detector positioned to receive fluorescent light from the plurality of fluors having wavelengths corresponding to the respective fluorescence emission bands of the fluors and adapted to produce a signal representative of the intensity of light received from the object.

2. The imaging system of claim 1 further comprising an optical blocking element positioned to intercept light from the object, and adapted to selectively prevent light having wavelengths corresponding to the plurality of separate excitation bands of the source light from reaching the detector.

3. The imaging system of claim 1 further comprising an optical dispersing element positioned to intercept light from the object, and adapted to disperse light received from the plurality of fluors according to wavelength and to direct the dispersed light onto the detector.

4. An imaging system for illuminating an object having a plurality of fluors and for detecting fluorescent radiation emitted by the fluors, the fluors having respective absorption bands and respective fluorescence emission bands, the imaging system comprising:

a light source for simultaneously illuminating the object with light having a plurality of separate excitation bands respectively falling within the fluorescent absorption bands of the fluors;

a detector positioned to receive fluorescent light from the fluors having wavelengths corresponding to the respective fluorescence emission bands of the fluors and adapted to produce a signal representative of the intensity of light received from the object; and an optical blocking element positioned to intercept light from the object, and adapted to selectively prevent light having wavelengths corresponding to the wavelengths of the plurality of separate excitation bands of the source light from reaching the detector and to selectively pass light having wavelengths between at least one pair of the plurality of separate excitation bands, wherein a central wavelength of at least one of the excitation bands lies within any one or between any two of the fluorescence emission bands.

5. The imaging system of claim 4 further comprising an optical dispersing element positioned to intercept light from the object, and adapted to disperse the received light according to wavelength and to direct the dispersed light onto the detector.

6. The imaging system of claim 4 wherein the light source comprises an optical filter adapted to receive light from a broadband light source and to produce therefrom light corresponding to the separate excitation bands of the illuminating source light.

7. The imaging system of claim 6 wherein the optical filter has a selected pattern of one or more light transmissive regions and one or more non-transmissive regions.

8. The imaging system of claim 4 wherein the light source comprises an optical filter comprising a first optical element positioned to receive light from a source light having a first wavelength distribution and adapted to spatially distribute the received light according to wavelength, and a second optical element positioned to receive the light spatially distributed by the first optical element and having a selected pattern of regions of different light-modifying properties selected to selectively separate, from the light of the first wavelength distribution, light of a second wavelength distribution corresponding to the separate excitation bands of the illuminating light.

9. The imaging system of claim 8 wherein the selected pattern of regions of the second optical element comprises one or more light-transmissive regions and one or more non-transmissive regions.

10. The imaging system of claim 8 further comprising a third optical element positioned to receive light dispersed by the first optical element and adapted to converge the received light so that the converged light is no longer spatially separated according to wavelength.

11. The imaging system of claim 8 wherein the optical filter is positioned to receive light from the object and is further adapted to selectively prevent light having a wavelength corresponding to the separate excitation bands of the illuminating light from reaching the detector.

12. The imaging system of claim 8 further comprising an optical blocking element positioned to receive light from the object and adapted to selectively prevent light having a wavelength corresponding to the separate excitation bands of the illuminating light from reaching the detector, the optical blocking element having a selected pattern of regions of different light-modifying properties that is complementary to the pattern of regions of the second optical element of the optical filter.

13. The imaging system of claim 4 wherein the excitation bands of the illuminating light are separated by about 35–50 nm and have respective spectral widths of about 5–10 nm.

14. A method for imaging an object having a plurality of fluors, the fluors having respective absorption bands and respective fluorescence emission bands, the method comprising the steps of:

simultaneously illuminating the object with light having a plurality of separate excitation bands respectively falling within the fluorescent absorption bands of the plurality of fluors;

receiving fluorescent light having wavelengths between at least one pair of the plurality of separate excitation bands from the plurality of fluors in the illuminated object;

preventing light having a wavelength corresponding to the excitation bands of the illuminating light from being received during the receiving step, wherein a central wavelength of at least one of the excitation bands lies within any one or between any two of the fluorescence emission bands; and producing a signal representative of the intensity of light received from the object.

15. The method of claim 14, wherein the step of illuminating the object comprises:

receiving light having a first wavelength distribution;

spatially distributing the received light according to wavelength; and selectively separating, from the light of the first wavelength distribution, light corresponding to a second wavelength distribution, said second wavelength distribution corresponding to the excitation bands of the illuminating light.

16. The method of claim 14 further comprising the step of dispersing light received from the fluors according to wavelength before the signal producing step.

17. The method of claim 14 wherein the signal producing step comprises producing signals representative of the intensity profile of light received from the fluors as a function of wavelength.

18. A method for imaging an object having a plurality of fluors, the fluors having respective absorption bands and respective fluorescence emission bands, the method comprising the steps of:

providing a beam of light from a broadband light source along a first optical beam path;

positioning an optical filter in the first optical beam path, the optical filter selectively transmitting light having wavelengths corresponding to a plurality of separate excitation bands respectively falling within the fluorescence absorption bands of the fluors and selectively blocking light corresponding to other wavelengths;

simultaneously illuminating the object with the light having a plurality of separate excitation bands;

receiving with the optical filter fluorescent light from the plurality of fluors in the illuminated object, the optical filter reflecting along a second beam path light corresponding to wavelengths other than the separate wavelength passbands of the illuminating light and selectively transmitting along a third optical beam path light corresponding to the wavelengths of the plurality of separate excitation bands, wherein a central wavelength of at least one of the excitation bands lies within any one or between any two of the fluorescence emission bands;

detecting light in the second optical beam path corresponding to wavelengths other than the excitation bands of the illuminating light; and producing a signal representative of the intensity of light received by a detector.

19. The method of claim 18 further comprising, before the detecting step, the step of spatially distributing the light received from the plurality of fluors according to wavelength to enable production of signals representative of the intensity profile of light received from the fluors as a function of wavelength.

20. An imaging system for illuminating an object having a plurality of fluors and for detecting fluorescent radiation emitted by the fluors, the fluors having respective absorption bands and respective fluorescence emission bands, the imaging system comprising:

a light source for simultaneously illuminating the object with light having a plurality of separate excitation bands respectively falling within the fluorescent absorption bands of the fluors;

a detector positioned to receive fluorescent light from the plurality of fluors having wavelengths corresponding to the respective fluorescence emission bands of the fluors and adapted to produce a signal representative of the intensity of light received from the object; and wherein the light source comprises
an optical filter comprising
a first optical element positioned to receive light from a source light having a first wavelength distribution and adapted to spatially distribute the received light according to wavelength, and
a second optical element positioned to receive the light spatially distributed by the first optical element and having a selected pattern of regions of different light-modifying properties selected to selectively separate, from the light of the first wavelength distribution, light of a second wavelength distribution corresponding to the separate excitation bands of the illuminating light, wherein the selected pattern of regions of the second optical element comprises one or more light-transmissive regions and one or more non-transmissive regions.

21. The imaging system of claim 20 further comprising a third optical element positioned to receive light dispersed by the first optical element and adapted to converge the received light so that the converged light is no longer spatially separated according to wavelength.

22. The imaging system of claim 20 wherein the optical filter is positioned to receive light from the object and is further adapted to selectively prevent light having a wavelength corresponding to the separate excitation bands of the illuminating light from reaching the detector.

23. The imaging system of claim 20 further comprising an optical blocking element positioned to receive light from the object and adapted to selectively prevent light having a wavelength corresponding to the separate excitation bands of the illuminating light from reaching the detector, the optical blocking element having a selected pattern of regions of different light-modifying properties that is complementary to the pattern of regions of the second optical element of the optical filter.

24. An imaging system for illuminating an object having a plurality of fluors and for detecting fluorescent radiation emitted by the fluors, the fluors having respective absorption bands and respective fluorescence emission bands, the imaging system comprising:

a light source for simultaneously illuminating the object with light having a plurality of separate excitation bands respectively falling within the fluorescent absorption bands of the fluors;

a detector positioned to receive fluorescent light from the plurality of fluors having wavelengths corresponding to the respective fluorescence emission bands of the fluors and adapted to produce a signal representative of the intensity of light received from the object;

an optical blocking element positioned to intercept light from the object, and adapted to selectively prevent light having wavelengths corresponding to the wavelengths of the plurality of separate excitation bands of the source light from reaching the detector; and wherein the light source comprises
an optical filter comprising
a first optical element positioned to receive light from a source light having a first wavelength distribution and adapted to spatially distribute the received light according to wavelength, and a second optical element positioned to receive the light spatially distributed by the first optical element and having a selected pattern of regions of different light-modifying properties selected to selectively separate, from the light of the first wavelength distribution, light of a second wavelength distribution corresponding to the separate excitation bands of the illuminating light, wherein the selected pattern of regions of the second optical element comprises one or more light-transmissive regions and one or more non-transmissive regions.

25. The imaging system of claim 24 further comprising a third optical element positioned to receive light dispersed by the first optical element and adapted to converge the received light so that the converged light is no longer spatially separated according to wavelength.

26. The imaging system of claim 24 wherein the optical filter is positioned to receive light from the object and is further adapted to selectively prevent light having a wavelength corresponding to the separate excitation bands of the illuminating light from reaching the detector.

27. The imaging system of claim 24 further comprising an optical blocking element positioned to receive light from the object and adapted to selectively prevent light having a wavelength corresponding to the separate excitation bands of the illuminating light from reaching the detector, the optical blocking element having a selected pattern of regions of different light-modifying properties that is complementary to the pattern of regions of the second optical element of the optical filter.

* * * * *